United States Patent [19]

Shyu

[11] Patent Number: 5,398,856
[45] Date of Patent: Mar. 21, 1995

[54] TISSUE RACK FOR AUTOMOBILES

[76] Inventor: Jenn-Shyong Shyu, No. 5, Lane 36, Shih-Chien Rd., Chang-Hua City, Taiwan, Prov. of China

[21] Appl. No.: 253,491

[22] Filed: Jun. 3, 1994

[51] Int. Cl.⁶ .................................................. B60R 7/00
[52] U.S. Cl. ...................................... 224/277; 224/311; 248/311.3; 248/905
[58] Field of Search ............... 224/277, 311, 42.45 R; 248/311.3, 905

[56] References Cited

U.S. PATENT DOCUMENTS

| 3,827,664 | 8/1974 | Larson | 224/42.45 R |
| 3,982,717 | 9/1976 | Pavelle et al. | 248/905 |
| 4,696,448 | 9/1987 | Mazloom et al. | 224/277 |

FOREIGN PATENT DOCUMENTS 2049222  2/1993  Canada .............................. 224/311

Primary Examiner—Linda J. Sholl

[57] ABSTRACT

A tissue rack including a springy mounting plate fastened to the inside rear view mirror of an automobile and the roof thereof, and a rack body welded to the mounting plate for holding a body of tissue, wherein the rack body is made by bending a metal wire into shape, having two front clamping portions and a back clamping portions disposed in parallel for clamping on two opposite sides of the box of tissue paper, and two supporting portions connected between the front and back clamping portions at two opposite sides for supporting the box of tissue paper.

1 Claim, 4 Drawing Sheets

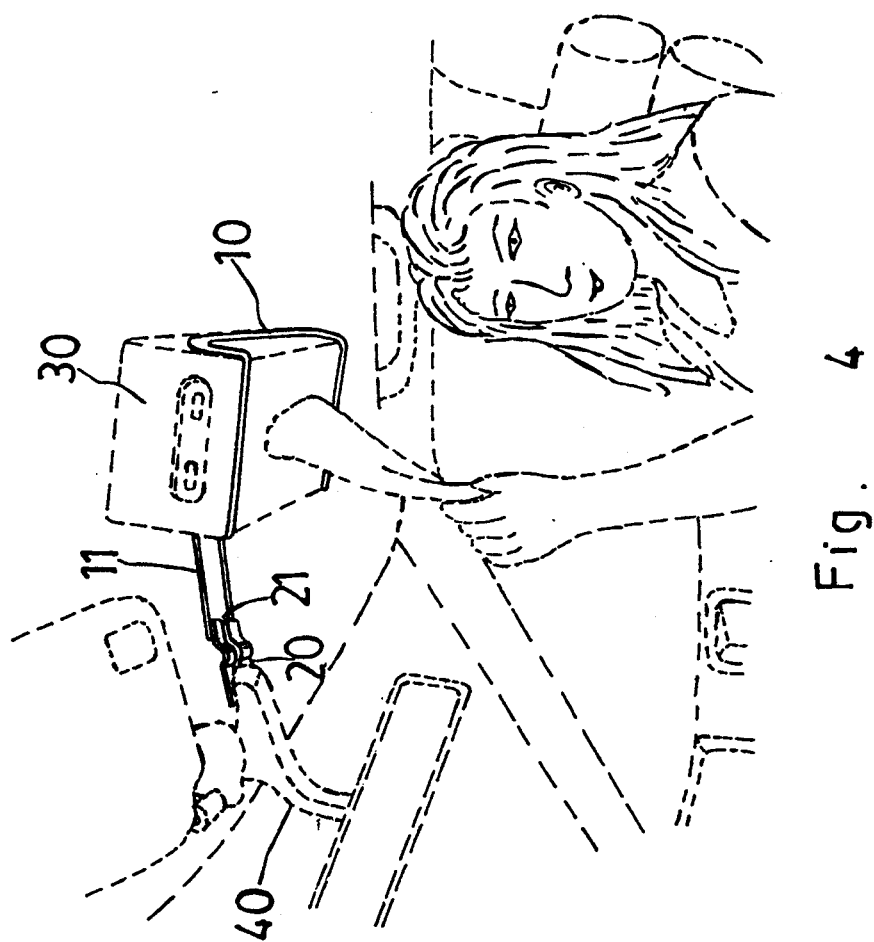

TISSUE RACK FOR AUTOMOBILES

BACKGROUND OF THE INVENTION

The present invention relates to a tissue rack which comprises a mounting plate for fastening to the inside rear view mirror mounting device of an automobile and a rack body welded to the mounting plate for holding a box of tissue paper.

Tissue paper has been intensively used as a handkerchief, towel, etc. for whipping off dirts and sweat from the body as well as for cleaning things. A car owner may put a box of tissue paper inside the automobile for use. However, regular automobiles do not have any rack specifically designed for holding a box of tissue paper. When a box of tissue paper is put on the instrument board or any place inside the automobile, it may slip when the automobile is moving. While driving the automobile, it is difficult to draw a piece of tissue paper from the box of tissue paper which is not fixed in place.

SUMMARY OF THE INVENTION

The present invention has been accomplished under the circumstances in view. It is therefore an object of the present invention to provide a tissue rack which can be conveniently fastened to the roof of an automobile to hold a box of tissue paper within the reach of the driver or the passenger who sits on the front seat of the automobile. It is another object of the present invention to provide a tissue rack for holding a box of tissue paper inside an automobile which is easy to install. It is still another object of the present invention to provide a tissue rack for holding a box of tissue paper inside an automobile which is inexpensive to manufacture.

To achieve the aforesaid objects, there is provided a tissue rack comprised of a springy mounting plate having mounting holes for fastening to the inside rear view mirror mounting device of automobile and the roof thereof, and a rack body made from a metal wire for holding a box of tissue paper. The rack body comprises two front clamping portions for clamping on one side of the box of tissue paper being loaded on the rack body, two parallel legs having each one end welded to the rear end of the mounting plate at either side and an opposite end connected to either front clamping portion at right angles at the same elevation, a back clamping portion disposed in parallel with the front clamping portions at the same elevation, and two parallel supporting portions respectively connected between the back clamping portion and the front clamping portions at a different elevation. By pulling the back clamping portion downwards from the roof of the automobile, a box of tissue paper can be loaded on the rack body and then clamped in place by the front and back clamping portions of the rack body. When the hand is released from the back clamping portion, the rack body immediately returns to its former position causing the loaded box of tissue firmly attached to the roof of the automobile.

BRIEF DESCRIPTION OF THE DRAWINGS

FIG. 4 is an applied view of the present invention, showing a box of tissue paper loaded on the tissue rack and a sheet of tissue paper drawn out of the box of tissue paper.

DETAILED DESCRIPTION OF THE PREFERRED EMBODIMENT

Figure 1:
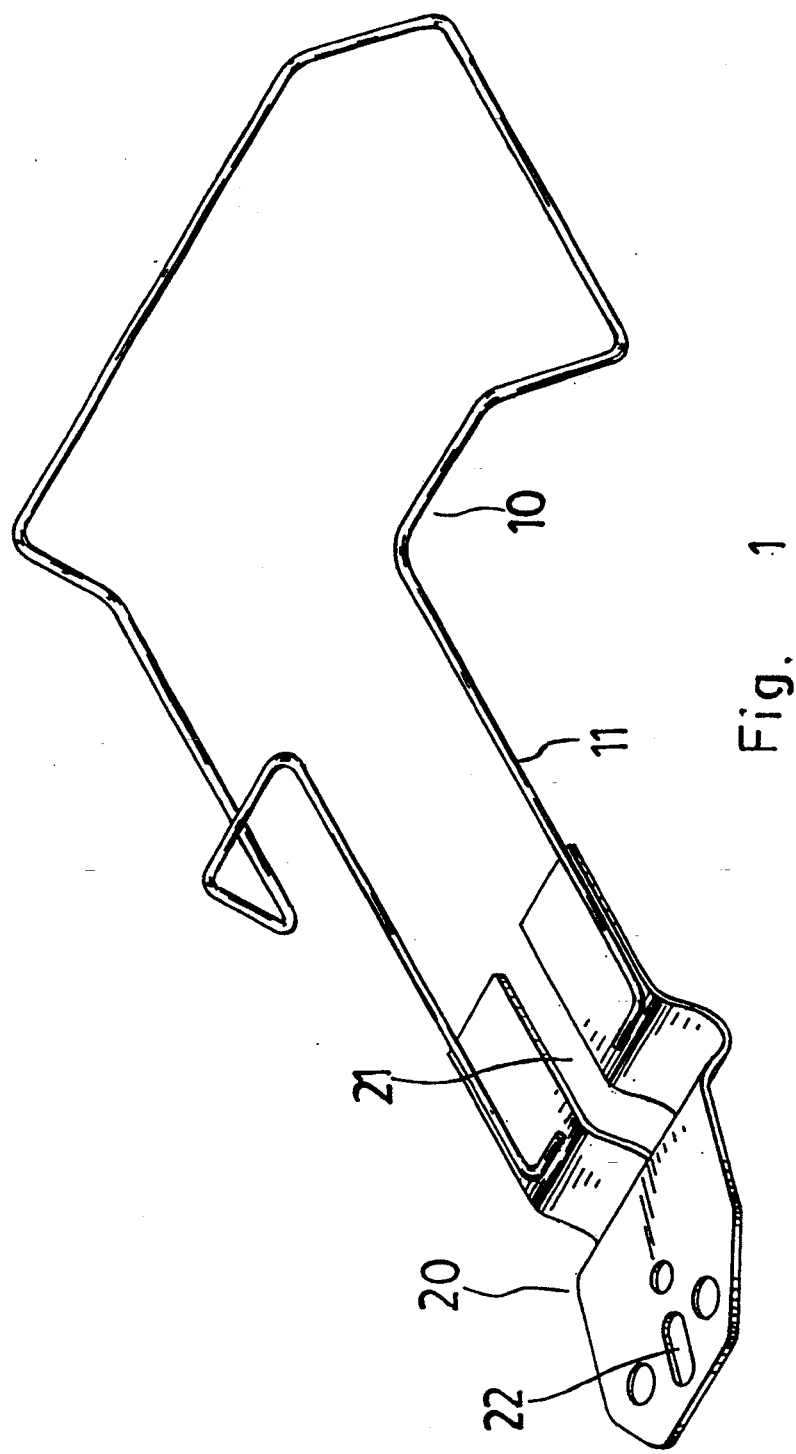
FIG. 1 is an elevational view of a tissue rack according to the present invention.

Referring to FIG. 1, a tissue rack in accordance with the present invention is comprised of an open rack body 10 made by bending a metal wire into an open loop for holding a box of tissue paper, and a springy mounting plate 20 connected to the open rack body 10 at one side for fastening the the inside rear view mirror mounting device of an automobile. The open rack body 10 comprises two parallel legs 11 bilaterally welded to the rear end of the springy mounting plate 20, a back clamping portion 14, two front clamping portions 12 respectively outwardly extended from the legs 11 at right angles and disposed in parallel with the back clamping portion 14 at the same elevation, and two parallel supporting portions 13 respectively connected between the back clamping portion 14 and the front clamping portions 12 at a different elevation. The springy mounting plate 20 is made by punching a flat metal plate into a substantially arched-shape (see FIG. 2) having a longitudinal opening 21 extended from the center thereof to the rear end thereof, and a plurality of mounting holes 22 near the front end thereof for fastening to the inside rear view mirror mounting device of an automobile and the roof thereof. The design of the longitudinal opening 21 improves the springy power of the springy mounting plate 20.

Figure 2:
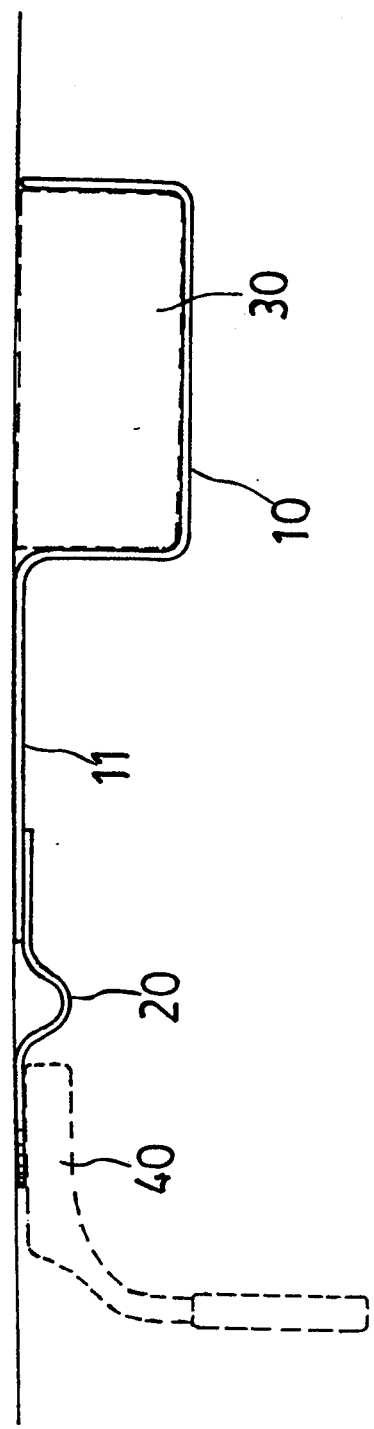
FIG. 2 is an installed view showing the tissue rack of the present invention fastened to the inside rear view mirror of an automobile.
Figure 3:
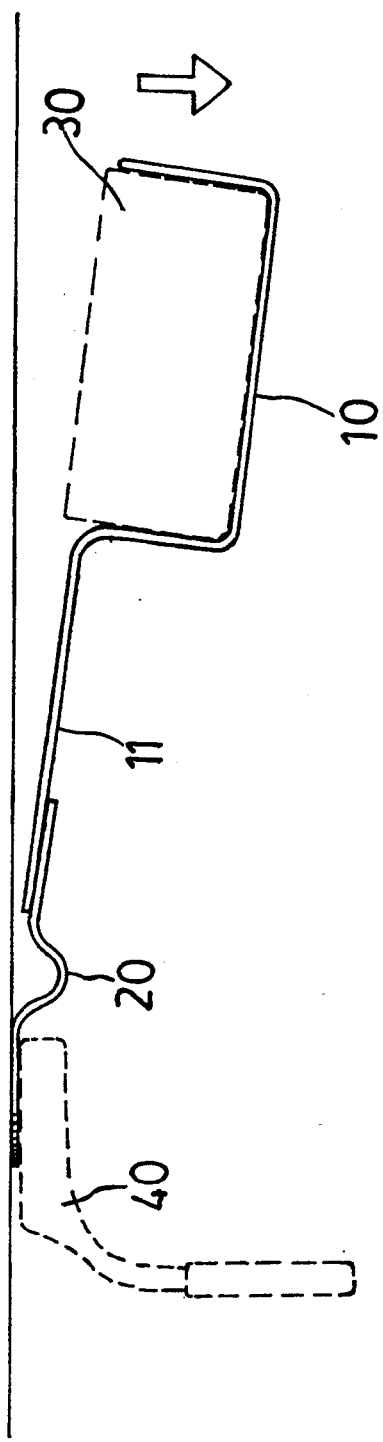
FIG. 3 is similar to FIG. 2 but showing the back clamping portion of the rack body pulled downwards from the roof of the automobile and a box of tissue paper loaded on the rack body.

Referring to FIGS. 2 and 3, by means of the mounting holes 22, the springy mounting plate 20 is fixed to the inside rear view mirror mounting device 40 of an automobile and closely attached to the roof of the automobile. When installed, the legs 11 and the front and back clamping portions 12 and 14 are closely attached to the roof of the automobile; the supporting portions 13 are spaced from the roof of the automobile. By pulling the back clamping portion 14 of the rack body 10 downwards from the roof of the automobile, a box of tissue paper 30 can be loaded on the rack body 10. When the rack body 10 is released from the hand, it immediately returns to its former shape, causing the box of tissue paper 30 firmly retained to the roof of the automobile without blocking up the inside rear view mirror from reflecting the area behind. When the box of tissue paper 30 is loaded, the back clamping portion 14 and the front clamping portions 12 clamp on two opposite sides of the box of tissue paper 30, and therefore the box of tissue paper 30 is hold down tight.

Referring to FIG. 4, when a box of tissue paper 30 is loaded on the rack body 10 of the tissue rack, the opening of the box of tissue paper 30 is disposed at the bottom so that the car driver can conveniently draw a sheet of tissue paper from the box of tissue paper without leaving from the seat.

Because the tissue rack is made by bending a metal wire into the aforesaid rack body 10 and punching a springy metal plate into the aforesaid mounting plate 20 and then welding the rack body 10 to the mounting plate 20, the manufacturing cost of the tissue rack is cheap.

I claim:

1. A tissue rack comprising a mounting plate having an arched portion transversely disposed in the middle, a plurality of mounting holes for fastening to the inside rear view mirror of an automobile and the roof thereof, and a longitudinal opening extended from said arched portion to a rear end thereof; a rack body made of a metal wire for holding a box of tissue paper, said rack body comprising two front clamping portions for clamping on one side of the box of tissue paper being loaded on said rack body, two parallel legs having each one end welded to the rear end of said mounting plate at either side and an opposite end connected to either front clamping portion at right angles at the same elevation, a back clamping portion disposed in parallel with said front clamping portions at the same elevation, and two parallel supporting portions respectively connected between said back clamping portion and said front clamping portions at a different elevation.

* * * * *